United States Patent [19]

Block

[11] Patent Number: 4,980,062

[45] Date of Patent: Dec. 25, 1990

[54] INORGANIC MEMBRANE

[75] Inventor: Jacob Block, Rockville, Md.

[73] Assignee: W. R. Grace & Co.-Conn, New York, N.Y.

[21] Appl. No.: 388,439

[22] Filed: Aug. 2, 1987

Related U.S. Application Data

[63] Continuation-in-part of Ser. No. 245,838, Sep. 16, 1988, abandoned.

[51] Int. Cl.$^5$ .............................................. B01D 71/02
[52] U.S. Cl. ............................... 210/490; 210/500.25; 427/246
[58] Field of Search .................... 210/490, 500.25, 496, 210/510.1; 427/244, 245, 246

[56] References Cited

FOREIGN PATENT DOCUMENTS 8303079 4/1985 Netherlands .................. 210/500.25

OTHER PUBLICATIONS

EPO 237865, 9-1987.

Primary Examiner—Frank Spear

Attorney, Agent, or Firm—James P. Barr

[57] ABSTRACT

A process for preparing microporous inorganic membranes comprising mixing a sol comprised of inorganic colloidal particles dispersed in a liquid medium with an organic polymeric film forming material dissolved in a suitable solvent. The liquid medium of the sol, the organic polymeric film forming material, and the solvent being selected such that:

(1) the liquid medium of the sol and the solvent are miscible,
(2) the organic polymeric film forming material is soluble in the solvent and
(3) the organic polymeric film forming material is insoluble in the liquid medium of the sol.

The mixture is applied to a porous support and the organic film forming material is allowed to separate from the solvent/sol to form a phase-separated coating. The phase-separated film coated support is dried to remove the solvent, and heated at a temperature sufficient to burn off the organic polymeric film forming material but below the sintering temperature, thereby leaving a microporous inorganic membrane.

20 Claims, 5 Drawing Sheets

INORGANIC MEMBRANE

BACKGROUND OF THE INVENTION

This application is a continuation-in-part of application Ser. No. 245,838, filed Sept. 16, 1988 now abandoned.

The present invention relates to an inorganic microporous membrane prepared by mixing an inorganic sol with a solution of an organic polymeric film forming material and coating a porous support with this mixture. The coated support is dried to remove the solvent and then heated to a temperature sufficient to burn off all organic material, resulting in a microporous inorganic membrane having pore diameters in the range from 0.01 to 10 microns.

Typical membrane filters of this pore size usually consist of organic polymeric materials such as cellulose acetate, polysulfone, nylon, tetrafluoroethylene polymer (Teflon ®), etc. The ceramic membranes of this invention represent a more versatile alternative to these organic polymeric membrane filters since higher temperatures or harsher conditions will not adversely affect their structural integrity. For example high temperature steam, strong solvents, high pH, or low pH may be used without damaging ceramic filters. In addition, the ability to withstand these conditions also permits these ceramic membranes to be reused by steam cleaning, or reheating to burn off any collected organic material.

Ceramic filters have been prepared by various methods known in the art. For example, U.S. Pat. No. 3,442,955 teaches a process for making permeable ceramic supports for semipermeable membranes in a reverse osmosis apparatus by combining 20-50 parts ball clay, up to 25 parts plastic fire clay, 10-15 parts powdered flux, 35-45 parts ground walnut shells (-60 mesh + 200 mesh) with 12-25% water, forming the support, drying and firing the support to 1900° to 2200° F. to burn out the walnut shells and sintering the body to form a ceramic bond.

U.S. Pat. No. 4,697,632 teaches ceramic porous bodies and ceramic foam filters suitable for use with molten metal, which are made by immersing a polyurethane foam pattern into a ceramic slurry, removing the excess ceramic slurry from the polyurethane foam pattern, and firing the polyurethane foam pattern to burn away the organic matter and thereby create a porous, hard, self-sustaining ceramic article.

U.S. Pat. No. 4,711,719 teaches a process for the production of dry, crack-free mechanically and chemically stable, thin, semi-permeable, inorganic membranes by coating a microporous support of sintered metal oxide or metal hydroxide with a stable sol of boehemite particles and subsequently drying and sintering the coated support at temperatures up to 1500° C.

U.S. Pat. No. 4,664,858 teaches a method of manufacturing a ceramic body having continuous three-dimensional through-out holes which can be employed as a filter for filtration of non-metallic inclusions in molten metal and as a porous plug for introducing a gaseous medium for floating up the non-metallic inclusions. This ceramic body is formed by placing an organic body having a three-dimensional construction into a casting mold, pouring a slurry of ceramic material into said mold, and after drying, heating to 1600° C. to decompose the organic porous material.

U.S. Pat. No. 4,540,535 teaches a porous ceramic filter for cleaning exhaust gases emitted from a diesel engine produced by immersing an organic three-dimensional network structure, such as polyurethane foam, within a ceramic slurry bath, spraying ceramic slurry on the outer surface of the structure to fill the pores, and then firing the structure at 1300° to 1470° C.

U.S. Pat. No. 4,180,411 teaches the use of microcrystalline cellulose as an extrusion aid and a combustible filler for rehydratable alumina to produce low density alumina substrates.

OBJECTS OF THE INVENTION

An object of this invention is to form a microporous inorganic membrane on a porous support.

Another object is to form microporous inorganic membranes by a novel process.

These and other objects will be apparent from the remaining specification and the appended claims.

DETAILED DESCRIPTION

The present invention is directed to a process of forming microporous inorganic membranes. As used herein, the term microporous refers to pore sizes in the range 0.01-10 microns in diameter. These microporous inorganic membranes are formed by mixing a sol comprised of inorganic, colloidal particles dispersed in a liquid medium with an organic polymeric film-forming material dissolved in a suitable solvent. The liquid medium of the sol, the organic film forming material and the solvent being selected such that:

(1) the liquid medium of the sol and the solvent are miscible,
(2) the organic polymeric film forming material is soluble in the solvent, and
(3) the organic polymeric film forming material is insoluble in the liquid medium of the sol.

When the sol and the dissolved polymeric film forming material are mixed, a "phase separated" system results which is comprised of the following three phases:

(1) a first phase consisting of a solution of the polymer solvent and the liquid component of the sol,
(2) a second phase consisting of the film forming polymer which is now insoluble in the above solution, and
(3) a third phase consisting of the sol particles dispersed in phase 1 above.

When the three-phase system is deposited as a coating onto a support, the polymer phase forms "film islands" within the solvent/sol phase, thus a phase-separated coating is formed. As used herein and in the appended claims, the term "phase-separated coating" refers to a coating wherein the polymer phase deposits are "film islands" surrounded by the inorganic sol phase. The phase-separated coated support is dried, and finally heated at a temperature sufficient to burn off the organic material but below the sintering temperature of the sol, thereby leaving a microporous inorganic microporous membrane.

Thus, under the process of this invention, the size of the pore diameters is independent of the temperatures to which the membranes are heated and are actually preformed at low temperatures since it is these phase-separated polymer "film islands" that determine the pore sizes of the final membrane.

Inorganic colloidal particles capable of forming the microporous membrane are typically precursors for relatively inert metal oxides. These include, but are not limited to, alumina, silica, titanium, zirconia, zircon, spinel, mullite, magnesia, silicon carbide, etc., or mixtures thereof. Contemplated equivalents of these compounds are those having the same general properties and are simple variations of these listed compounds. It is preferred to use alumina or silica. These inorganic colloidal particles are typically suspended in water but organic liquid media may also be used so long as it is miscible with the polymeric film forming solvent and the polymer is insoluble therein. The preferred liquid media is water. The concentration of particles in the liquid media is from about 0.5 to 10 percent by weight of metal oxide based on the total weight of the final mixture, and preferably between 1-2%.

The particle size of the inorganic colloidal particles used in this invention can range from 1 nm to 1 micron and are preferably in the range of 5 to 30 millimicrons.

Organic polymeric film forming materials operable herein are those capable of forming films, and are insoluble in the liquid media of the sol, including, but not limited to, cellulose acetate, cellulose nitrate, nylon, polysulfone, etc., or mixtures thereof. Contemplated equivalents of these materials are those film-forming materials that are simple variations of the listed compounds, are insoluble in the particular liquid medium of the sol, and are capable of forming the desired pore size of the claimed microporous membrane of this invention. A preferred material is cellulose acetate in conjunction with an aqueous alumina sol. The organic polymeric film forming material is present in concentrations of from about 0.5 to 10 percent by weight based on the total weight of the mixture, and preferably 1-2%.

The solvents used in this invention can be any inert liquids capable of solubilizing the organic polymeric film forming materials and which are also miscible with the liquid component of the sol. Typical solvents used are acetone, methanol, ethanol, toluene, dimethylformamide, dimethyl sulfoxide, etc., and mixtures thereof, and the preferred solvent employed herein is acetone. Contemplated equivalents of these solvents are those having the same general properties, and are simple variations of the chain lengths of the listed solvents.

The supports used in this invention can be any thermally stable solid porous material. The pore size of these supports can range from 1 to 50 microns and are preferably 1 micron. It is important that the pore size not be so large as to permit permeation of the coating mixture into the pores. It has been found that pre-saturation of the support material in solvents such as water, are effective to fill the pores and inhibit permeation of the coating mixture. Typical support materials include, but are not limited to, alumina, silica, mullite, cordierite, etc., or mixtures thereof; and additionally may be foamed to increase their porosity.

These supports may take the form of disks, sheets, or tubes, or may be extruded into monolithic shapes. The tubes or monoliths may contain circular, square, hexagonal or other shaped channels.

These supports may be coated with the coating mixture by any of the usual coating techniques including, but not limited to, applying the mixture onto the surface of the support, immersing the support into the mixture, pumping the mixture over the support, etc. Alternatively, the supports may be spun during the coating process to assure a uniform thickness of the surface coating layer.

After the supports have been coated, they are dried to remove the solvent, and heated to a temperature sufficient to burn off all of the organic polymeric film. The temperature of the heating step is not critical except that it should be high enough to assure complete decomposition of the organic polymeric film, but not so high that it causes sintering of the inorganic membrane. It has been found that temperatures slightly in excess of the minimum required to decompose the organic polymeric film are advantageous and serve to improve the adhesion of the inorganic membrane to the underlying porous support. The typical temperature range of the heating step is 450°-1000° C. and preferably is 550° C. Typical heating rates are 1°-3° C./minute and holding times at top temperature are 30-120 minutes. The preferred heating rate is 2° C./minute, and the preferred holding time is 30 minutes.

The following examples are provided to illustrate the invention in accordance with the principles of this invention, but are not to be construed as limiting the invention in any way except as indicated in the appended claims.

EXAMPLE 1

This example illustrates the preparation of a phase-separated $Al_2O_3$ film on a non-porous support.

Figure 1:
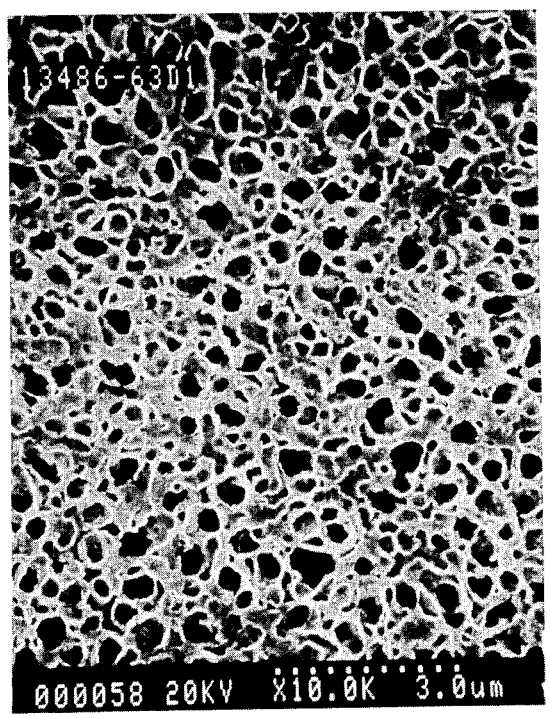
FIG. 1 is a micrograph of a microporous ceramic membrane formed from an aqueous $Al_2O_3$ sol, on a non-porous support showing pores 0.3-0.5 microns in diameter.

Cellulose acetate, 0.08 g, (acetyl content 39.8%) obtained from Aldrich Chemical Co. was dissolved in 6 g acetone. Alumina sol, 0.43 g, (20% $Al_2O_3$ in water obtained from Nyacol Products, Inc.) was added to the above solution and mixed well. A drop of the resulting mixture was placed on an aluminum dish whereupon the polymer phase separated from the solvent/sol phase. A phase separated film formed after drying in air for 1 hr. The film (and dish) were fired in a furnace to 550° C. (at 2° C./min) and held at 550° C. for 30 minutes. After cooling, the resulting film was examined by scanning electron microscopy (SEM) and was found to be a phase separated $Al_2O_3$, containing pores approximately 0.3 to 0.5 micron in diameter (FIG. 1).

EXAMPLE 2

This example shows that the phase separated $Al_2O_3$ coating can be prepared by dip coating.

Figure 2:
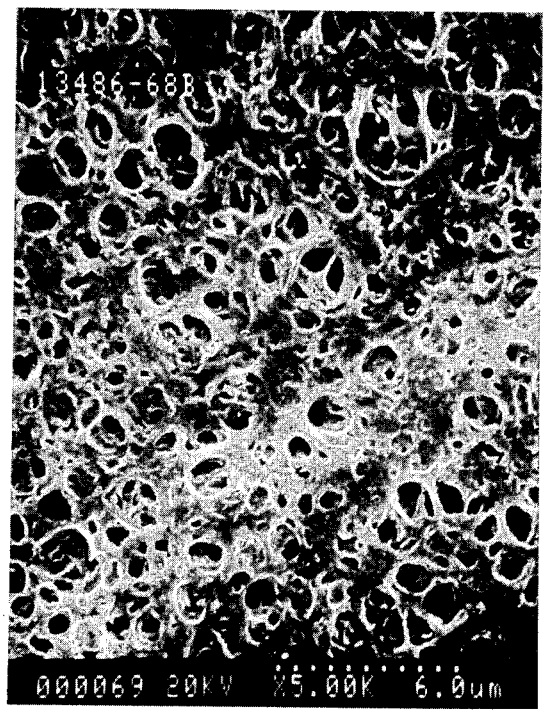
FIG. 2 is a micrograph of a microporous ceramic membrane formed from an aqueous $Al_2O_3$ sol, on a non-porous support showing pores 0.3-0.6 microns in diameter.

The experiment described in Example 1 was repeated, with the exception that the coating was formed by dipping a piece of aluminum into a sol-cellulose acetate-acetone mixture. FIG. 2 shows the phase separated $Al_2O_3$ film containing pores about 0.3–0.6 micron in diameter (FIG. 2).

EXAMPLE 3

Figure 3:
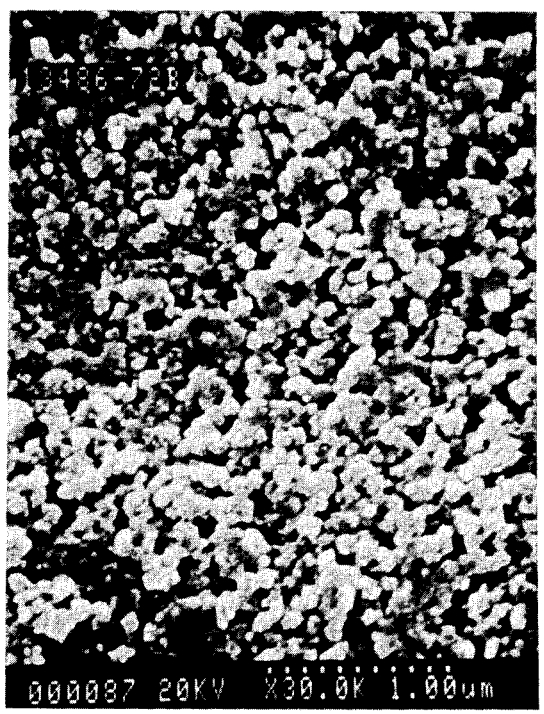
FIG. 3 is a micrograph of a microporous ceramic membrane formed from a non-aqueous $SiO_2$ sol, on a non-porous support showing pores 0.05 to 0.1 micron in diameter.

This example shows that an organic-based silica sol can be used instead of an aqueous-based alumina sol. The cellulose acetate previously used was dissolved in acetone (0.1 g/7.5 g acetone). Nalco $SiO_2$ sol (0.1 g) (Nalco 84SS258, 30% $SiO_2$ in glycol propyl ether) was added and mixed well. The coating was prepared as in Example 2. The resulting membrane had pores about 0.05 to 0.1 micron in diameter (FIG. 3).

EXAMPLE 4

Figure 4:
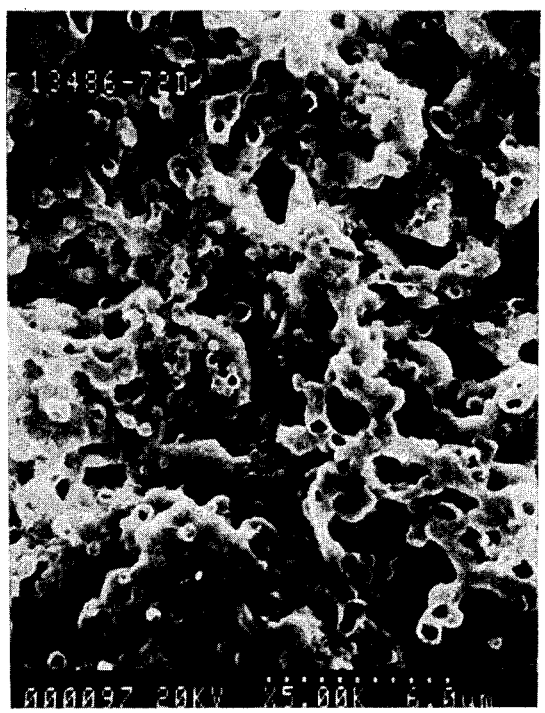
FIG. 4 is a micrograph of a microporous ceramic membrane formed from an aqueous $Al_2O_3$ sol on a porous alumina support sol showing pores about 1 micron in diameter.

This example illustrates the preparation of a phase separated $Al_2O_3$ film on a porous alumina support. The sol-cellulose acetate-acetone mixture described in Example 1 was prepared. A porous $Al_2O_3$ support having pores about 1 micron in diameter was pre-saturated by boiling in water. The support was then dipped in the above sol-cellulose acetate-acetone mixture. The coating was then treated as in Example 1. A scanning electron micrograph showed the phase-separated alumina coating on the porous alumina support (FIG. 4).

EXAMPLE 5

This example illustrates the preparation of the phase-separated alumina film on a foamed alumina support.

Figure 5:
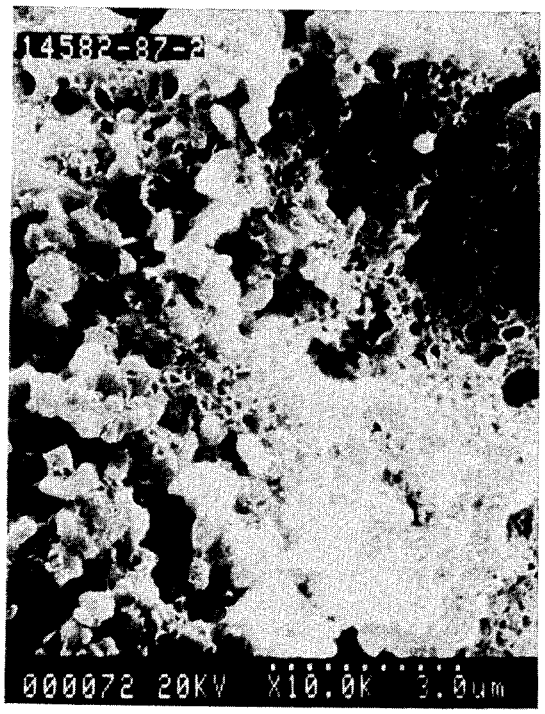
FIG. 5 is a micrograph of a microporous ceramic membrane on a porous foamed alumina support formed from an aqueous $Al_2O_3$ sol showing pores 0.1 to 0.2 micron in diameter.

Example 4 was repeated, with the exception that an alumina foam (30 micron pores) was used as a support. A scanning electron micrograph showed the phase-separated $Al_2O_3$ coating had pores of about 0.1–0.2 micron on the alumina foam support (FIG. 5).

What is claimed is:

1. A method of forming a microporous inorganic membrane on a porous support comprising:
   (a) mixing a sol comprised of inorganic colloidal particles dispersed in a liquid medium with an organic polymeric film forming material dissolved in a suitable solvent, the liquid medium of said sol, the organic polymeric film-forming material and the solvent being selected such that:
      (i) the liquid medium of said sol and the solvent are miscible;
      (ii) the organic polymeric film-forming material is soluble in said solvent; and
      (iii) the organic polymeric film-forming material is insoluble in the liquid medium of said sol;
   (b) applying to a porous support the mixture from step (a) and allowing the mixture to form a phase-separated coating;
   (c) drying the phase-separated coated support to remove the solvent and liquid medium of the sol; and
   (d) heating the dried coated support at a temperature sufficient to burn off the organic polymeric film forming material but below the sintering temperature, thereby leaving a microporous inorganic membrane.

2. A method of forming a microporous inorganic membrane on a porous support according to claim 1, wherein the inorganic sol is selected from the group of alumina, silica, titanium, zirconia, zircon, spinel, mullite, magnesia, silicon carbide, and mixtures thereof.

3. A method of forming a microporous inorganic membrane on a porous support according to claim 1, wherein the concentration of the inorganic sol is in the range 0.5–10% by weight of metal oxide.

4. A method of forming a microporous inorganic membrane on a porous support according to claim 1, wherein the concentration of the inorganic sol is in the range 1–2% by weight of metal oxide.

5. A method of forming a microporous inorganic membrane on a porous support according to claim 1, wherein the polymeric film solvent is selected from the group of acetone, methanol, ethanol, toluene, dimethylformamide, dimethyl sulfoxide and mixtures thereof.

6. A method of forming a microporous inorganic membrane on a porous support according to claim 1, wherein the organic polymeric film forming material is selected from the group of cellulose acetate, cellulose nitrate, nylon, polysulfone, tetrafluoroethylene polymer, and mixtures thereof.

7. A method of forming a microporous inorganic membrane on a porous support according to claim 1, wherein the organic polymeric film forming material is cellulose acetate, the solvent is acetone, and the inorganic sol is alumina.

8. A method of forming a microporous inorganic membrane on a porous support according to claim 1, wherein the porous support has pore sizes in the range 1 to 50 microns, and the membrane has pore sizes in the range .01 to 10 microns.

9. A method of forming a microporous inorganic membrane on a porous support according to claim 1, wherein the support is alumina, the organic polymeric film forming material is cellulose acetate, the solvent is acetone, the inorganic sol is alumina, and the liquid medium is water.

10. A method of forming a microporous inorganic membrane on a porous support according to claim 1, wherein the support is foamed alumina.

11. A method of forming a microporous inorganic membrane on a porous support according to claim 1, wherein the support is in the shape of a disk.

12. A method of forming a microporous inorganic membrane on a porous support according to claim 1, wherein the support is in the shape of a sheet.

13. A method of forming a microporous inorganic membrane on a porous support according to claim 1, wherein the support is in the shape of a tube.

14. A method of forming a microporous inorganic membrane on a porous support according to claim 1, wherein the support is in the shape of a extruded monolith.

15. A method of forming a microporous inorganic membrane on a porous support according to claim 1, wherein the support is in the shape of a tube with a plurality of channels extending through said tube parallel to the longitudinal axis.

16. A method of forming a microporous inorganic membrane on a porous support according to claim 1, wherein the support is in the shape of an extruded monolith with a plurality of channels extending therethrough.

17. A method of forming a microporous inorganic membrane on a porous support according to claim 1, wherein the support is presaturated with a liquid to inhibit permeation of the coating mixture.

18. A microporous membrane made by the process of claim 1.

19. A method of forming a microporous inorganic membrane on a porous support comprising:
   (a) mixing a sol comprised of alumina particles dispersed in water with cellulose acetate dissolved in acetone;

(b) applying to a porous support the mixture from (a) and allowing the mixture to form a phase-separated coating;
(c) drying the phase-separated coating to remove the water and acetone;
(d) heating the dried coated support at a temperature in the range 450° to 550° C. to burn off the cellulose acetate, thereby leaving a microporous alumina membrane.

20. A method of forming a microporous inorganic membrane on a porous support comprising:

(a) mixing a sol comprised of silica particles dispersed in glycol propyl ether with cellulose acetate dissolved in acetone;
(b) applying to a porous support the mixture from (a) and allowing the mixture to form a phase-separated coating;
(c) drying the phase-separated coating to remove the glycol propyl ether and acetone;
(d) heating the dried coated support at a temperature in the range 450° to 550° C. to burn off the cellulose acetate, thereby leaving a microporous silica membrane.

* * * * *